UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

MOLDED COMPOSITION AND METHOD OF MAKING THE SAME.

1,299,847. Specification of Letters Patent. Patented Apr. 8, 1919.

No Drawing. Application filed February 3, 1916. Serial No. 76,021.

*To all whom it may concern:*

Be it known that I, JAMES P. A. McCoy, a subject of the King of Great Britain, and a resident of Wilkinsburg, in the county of Allegheny and State of Pennsylvania, have invented a new and useful Improvement in Molded Compositions and Methods of Making the Same, of which the following is a specification.

My invention relates to molded compositions of the type consisting of a hard and somewhat porous base impregnated with a water-proofing, heat-resisting or electric insulating agent, and it has for its object to provide a material of the character indicated comprising a new and advantageous impregnating agent.

Composite blocks, plates and refractory lumber are commonly made by mixing a cementitious material such as Portland cement with water and with a filler such as asbestos, molding the composition in the required shapes and permitting it to set and finally soaking the resulting objects in a solution of creosote or pitch. When Portland cement is the cementitious ingredient, it is usual to treat the mixture with carbon dioxid before the impregnating step in order to convert a portion of the lime that is present in the cement into carbonate.

I have discovered that compositions of the above indicated class may be greatly improved, with respect to their heat-resisting and electric insulating properties, by impregnation with certain resins consisting chiefly of cumaron, indene, para-cumaron and para-indene, the preparation and characteristics of which are described in my copending application for Letters Patent Serial No. 20,752, filed April 12, 1915. These resins, when melted, form fluids of low viscosity which are well suited for the impregnation of porous masses such as asbestos-cement blocks. The impregnation is effected in any ordinary manner, such as by immersing the objects to be impregnated in the melted resins until the desired quantity of material has been absorbed, draining the articles and then subjecting them to moderate heat. The heat treatment may suitably be performed by heating the articles in an oven between 100° C. and 120° C. for six hours or more and then raising the heat to about 200° C. for a somewhat longer period. This treatment effects the complete polymerization of the para-resins which cannot thereafter be expelled from the impregnated articles by heat. In this respect, impregnated articles prepared in accordance with my invention are superior to those which are impregnated with creosote, pitch or other impregnating agents that may be expelled to an objectionable degree when the articles are exposed to heat.

While I have mentioned blocks or plates of asbestos-cement mixtures as the basis for treatment with the impregnating agents described herein, it is to be understood that my invention is not limited to this use, but may be applied to the impregnation of any and all porous substances. It is also to be understood that no limitations with respect to either process steps or materials are to be imposed upon my invention except as indicated in the appended claims.

I claim as my invention:

1. A molded composition comprising a cement base and an impregnating agent containing a polymerized coal-tar derivative.

2. A molded composition comprising a porous base and an impregnating agent containing at least one of the following substances: cumaron, indene and the polymers of cumaron and indene.

3. A molded composition comprising a porous base and a polymerization product of cumaron and indene.

4. A molded composition comprising a porous base and an impregnating agent containing a resinous coal-tar derivative composed of cumaron, indene, para-cumaron and para-indene.

5. A molded composition comprising a cementitious ingredient, a filler, and an impregnating agent containing a polymerized coal-tar distillation derivative.

6. A molded composition comprising a cementitious ingredient, a filler, and an impregnating agent containing at least one of the following substances: cumaron, indene, and the polymers of cumaron and indene.

7. A molded composition comprising a cementitious ingredient, a filler, and a polymerization product of cumaron and indene.

8. A molded composition comprising a cementitious ingredient, a filler, and an impregnating agent composed of cumaron, indene, para-cumaron and para-indene.

9. A molded composition comprising Portland cement, asbestos, and an impregnating agent containing at least one of the following substances: cumaron, indene, and the polymers of cumaron and indene.

10. A molded composition comprising Portland cement, asbestos, and a polymerization product of cumaron and indene.

11. A molded composition comprising Portland cement, asbestos, and an impregnating agent composed of cumaron, indene, para-cumaron and para-indene.

12. The process of making molded compositions that comprises mixing a cementitious material and a filler, permitting the mixture to set, applying a polymerizable distillation derivative of coal-tar to the resulting objects, and polymerizing the said impregnating agent.

13. The process of making molded compositions that comprises mixing Portland cement, water and comminuted asbestos, permitting the mixture to set, applying a polymerizable distillation derivative of coal tar to the resulting objects, and polymerizing the said impregnating agent.

14. The process of making molded compositions that comprises mixing a cementitious material and a filler, permitting the mixture to set, applying to the resulting objects an impregnating agent comprising a resinous coal-tar derivative containing at least one of the following substances: cumaron, indene, para-cumaron and para-indene, and finally heating the objects to further polymerize the said resins.

In testimony whereof I have hereunto subscribed my name this 27th day of Jan. 1916.

JAMES P. A. McCOY.